(12) United States Patent
Acee

(10) Patent No.: US 11,572,155 B2
(45) Date of Patent: Feb. 7, 2023

(54) ROTORCRAFT HAVING PROPELLER GENERATED POWER DURING AUTOROTATIONS

(71) Applicant: Textron Innovations Inc., Providence, RI (US)

(72) Inventor: Aaron Alexander Acee, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 246 days.

(21) Appl. No.: 16/666,347

(22) Filed: Oct. 28, 2019

(65) Prior Publication Data
US 2021/0122460 A1 Apr. 29, 2021

(51) Int. Cl.
| | |
|---|---|
| *B64C 19/00* | (2006.01) |
| *B64D 35/04* | (2006.01) |
| *B64C 27/39* | (2006.01) |
| *B64C 11/30* | (2006.01) |
| *F16D 41/12* | (2006.01) |
| *B64C 27/82* | (2006.01) |

(52) U.S. Cl.
CPC .............. *B64C 19/00* (2013.01); *B64C 11/30* (2013.01); *B64C 27/39* (2013.01); *B64C 27/82* (2013.01); *B64D 35/04* (2013.01); *F16D 41/12* (2013.01); *B64C 2027/8236* (2013.01)

(58) Field of Classification Search
CPC ......... B64C 19/00; B64C 11/30; B64C 27/39; B64C 27/82; B64C 2027/8236; B64D 35/04; F16D 41/12
See application file for complete search history.

(56) References Cited

U.S. PATENT DOCUMENTS

| | | | | |
|---|---|---|---|---|
| 3,448,946 A | * | 6/1969 | Nagatsu | B64C 27/12 244/17.19 |
| 3,506,219 A | * | 4/1970 | Mouille | B64C 27/12 244/17.21 |
| 3,540,680 A | * | 11/1970 | Peterson | B64C 27/82 416/123 |
| 6,364,249 B1 | * | 4/2002 | Morgan | B64C 27/14 244/17.11 |
| 8,424,798 B2 | | 4/2013 | Challis | |
| 9,321,526 B2 | | 4/2016 | Fink et al. | |
| 10,370,094 B2 | | 8/2019 | Garcia | |

(Continued)

*Primary Examiner* — Joshua J Michener
*Assistant Examiner* — Colin Zohoori
(74) *Attorney, Agent, or Firm* — Lawrence Youst PLLC

(57) ABSTRACT

A rotorcraft having pusher propeller generated power during autorotations. The rotorcraft has an engine powered mode and an autorotation mode. The rotorcraft includes an engine and a drivetrain configured to receive torque and rotational energy from the engine in the engine powered mode. A main rotor system is coupled to the drivetrain and is rotatable to generate lift and forward thrust for the rotorcraft in the engine powered mode. A pusher propeller is coupled to the drivetrain and is rotatable to generate forward thrust for the rotorcraft in the engine powered mode. In the autorotation mode, the pusher propeller is aerodynamically driven responsive to airflow therethrough and the drivetrain is configured to receive torque and rotational energy from the pusher propeller, thereby providing power to the main rotor system.

20 Claims, 4 Drawing Sheets

(56) References Cited

U.S. PATENT DOCUMENTS

| | | |
|---|---|---|
| 10,414,512 B2 | 9/2019 | Luszcz |
| 10,526,085 B2 * | 1/2020 | Fenny .................. H02P 29/032 |
| 10,933,990 B2 * | 3/2021 | Ivans ..................... B64C 27/26 |
| 2006/0269413 A1 * | 11/2006 | Cotton .................... B64C 27/82 |
| | | 416/170 R |
| 2012/0104155 A1 * | 5/2012 | Yarger ................... B64C 27/82 |
| | | 244/17.19 |
| 2013/0134256 A1 * | 5/2013 | Gaillard ................. B64C 27/82 |
| | | 244/17.21 |
| 2017/0274994 A1 * | 9/2017 | Eller ...................... B64C 27/12 |
| 2020/0070996 A1 * | 3/2020 | Hefner ................... B64C 27/06 |
| 2020/0223540 A1 * | 7/2020 | Ivans ..................... B64C 27/26 |

\* cited by examiner

ROTORCRAFT HAVING PROPELLER GENERATED POWER DURING AUTOROTATIONS

TECHNICAL FIELD OF THE DISCLOSURE

The present disclosure relates, in general, to autorotation and flare recovery operations of rotorcraft and, in particular, to rotorcraft having a main rotor system and a pusher propeller that is aerodynamically driven responsive to airflow therethrough during autorotations of the main rotor system to provide power to the main rotor system.

BACKGROUND

Rotorcraft are classified into various categories according to size and other factors and are subject to airworthiness requirements based upon these classifications. Examples include "Category A" and "Category B" classifications for rotorcraft set forth by the United States Federal Aviation Administration. To meet these requirements and to improve the overall safety of rotorcraft, it is desirable for rotorcraft to be capable of reducing their descent rates to an acceptable level upon experiencing an engine malfunction. One method of reducing the descent rate following an engine malfunction is through autorotation of the main rotor system wherein the aerodynamic force of air moving up through the main rotor system drives the main rotor system, thereby reducing rotor speed decay and enabling a controlled glide of the rotorcraft to the ground. Upon final approach during an autorotation landing, a flare recovery maneuver may be performed to convert kinetic energy of the main rotor system into lift using aft cyclic control, which further reduces the rate of descent and levels off the flight path trajectory of the rotorcraft. The flare recovery maneuver is typically performed just before touchdown with the altitude at which the maneuver is performed being dependent upon factors including the rotorcraft model, the descent rate, the airspeed, the headwind component and how rapidly the pilot moves the cyclic control stick.

SUMMARY

In a first aspect, the present disclosure is directed to a rotorcraft having an engine powered mode and an autorotation mode. The rotorcraft includes an engine and a drivetrain configured to receive torque and rotational energy from the engine in the engine powered mode. A main rotor system is coupled to the drivetrain and is rotatable to generate lift and forward thrust for the rotorcraft in the engine powered mode. A pusher propeller is coupled to the drivetrain and is rotatable to generate forward thrust for the rotorcraft in the engine powered mode. In the autorotation mode, the pusher propeller is aerodynamically driven responsive to airflow therethrough and the drivetrain is configured to receive torque and rotational energy from the pusher propeller, thereby providing power to the main rotor system.

In some embodiments, the drivetrain may include a transmission between the engine and the main rotor system wherein the transmission may be configured to adjust a rotating speed ratio between the engine and the main rotor system. In certain embodiments, the drivetrain may include a driveshaft that couples the transmission and the pusher propeller. In some embodiments, the drivetrain may include a freewheeling unit coupled between the engine and the transmission. In such embodiments, the freewheeling unit may be a sprag clutch. In some embodiments, the main rotor system may be a non-rigid main rotor system such as a fully articulated main rotor system. In certain embodiments, the main rotor system may include a plurality of rotor blades coupled to a rotor hub such that each rotor blade is configured to independently flap relative to the rotor hub about a flapping axis.

In some embodiments, the pusher propeller may include a plurality of variable pitch rotor blades. In such embodiments, the pitch of the rotor blades of the pusher propeller may be collectively controllable. In certain embodiments, the pitch of the rotor blades of the pusher propeller may be greater in the engine powered mode than in the autorotation mode of the rotorcraft. In some embodiments, a manual input may be used for reducing the pitch of the rotor blades of the pusher propeller when the rotorcraft transitions from the engine powered mode to the autorotation mode. In other embodiments, a flight control system may be configured to reduce the pitch of the rotor blades of the pusher propeller when the rotorcraft transitions from the engine powered mode to the autorotation mode. In certain embodiments, an anti-torque system may be coupled to the drivetrain and is rotated thereby to generate anti-torque thrust for the rotorcraft in the engine powered mode. In such embodiments, the anti-torque system may have variable pitch rotor blades and/or may be a tail rotor system.

In a second aspect, the present disclosure is directed to a rotorcraft having an engine powered mode and an autorotation mode. The rotorcraft includes an engine and a drivetrain configured to receive torque and rotational energy from the engine in the engine powered mode. A main rotor system is coupled to the drivetrain and is rotatable to generate lift and forward thrust for the rotorcraft in the engine powered mode. A pusher propeller is coupled to the drivetrain and is rotatable to generate forward thrust for the rotorcraft in the engine powered mode. The pusher propeller includes a plurality of variable pitch rotor blades. A flight control system is configured to collectively control the pitch of the rotor blades of the pusher propeller. In response to the rotorcraft transitioning from the engine powered mode to the autorotation mode, the flight control system is configured to reduce the pitch of the rotor blades of the pusher propeller. In the autorotation mode, the pusher propeller is aerodynamically driven responsive to airflow therethrough and the drivetrain is configured to receive torque and rotational energy from the pusher propeller, thereby providing power to the main rotor system.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
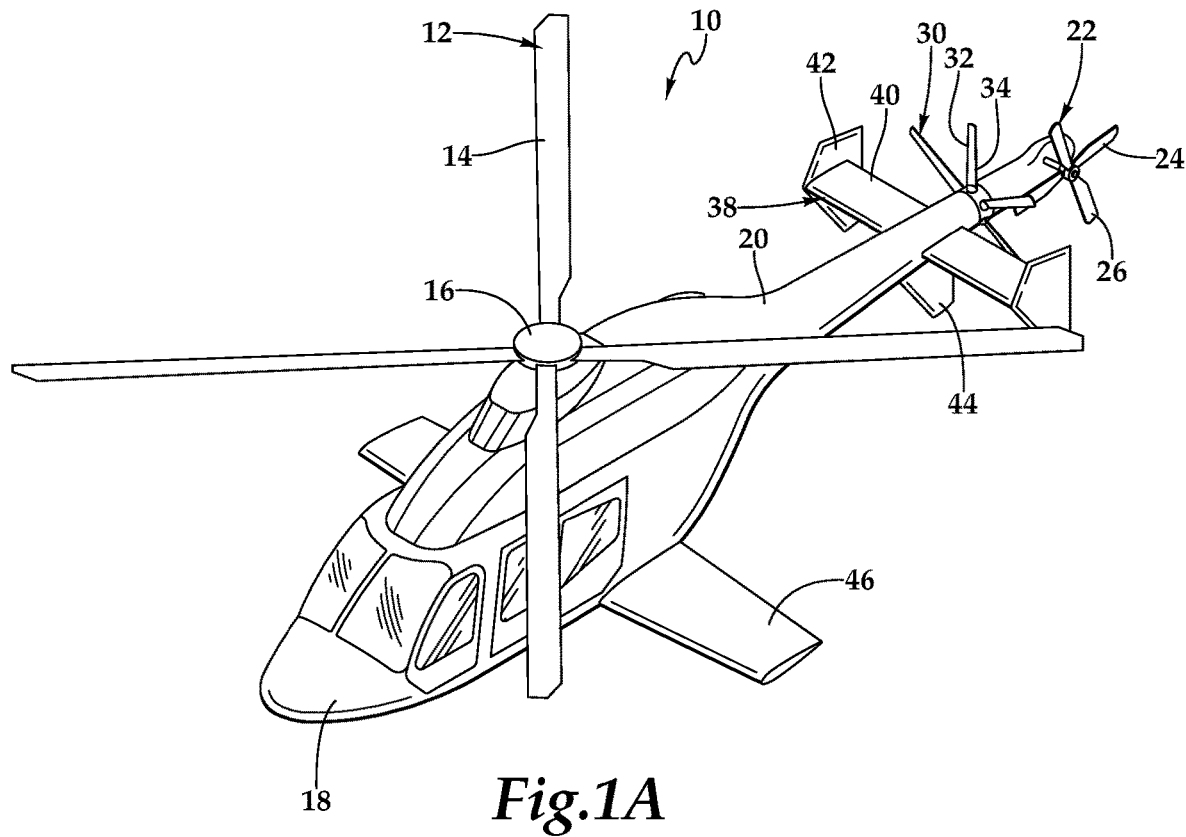
FIGS. 1A-1C are schematic illustrations of a rotorcraft having propeller generated power during autorotations in accordance with embodiments of the present disclosure.
Figure 1B:
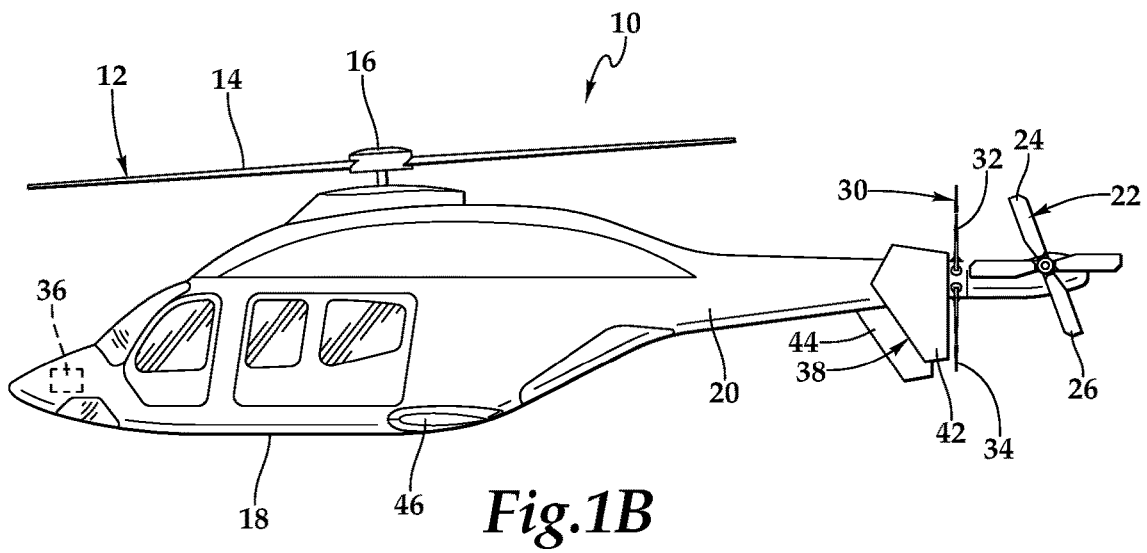
Figure 1C:
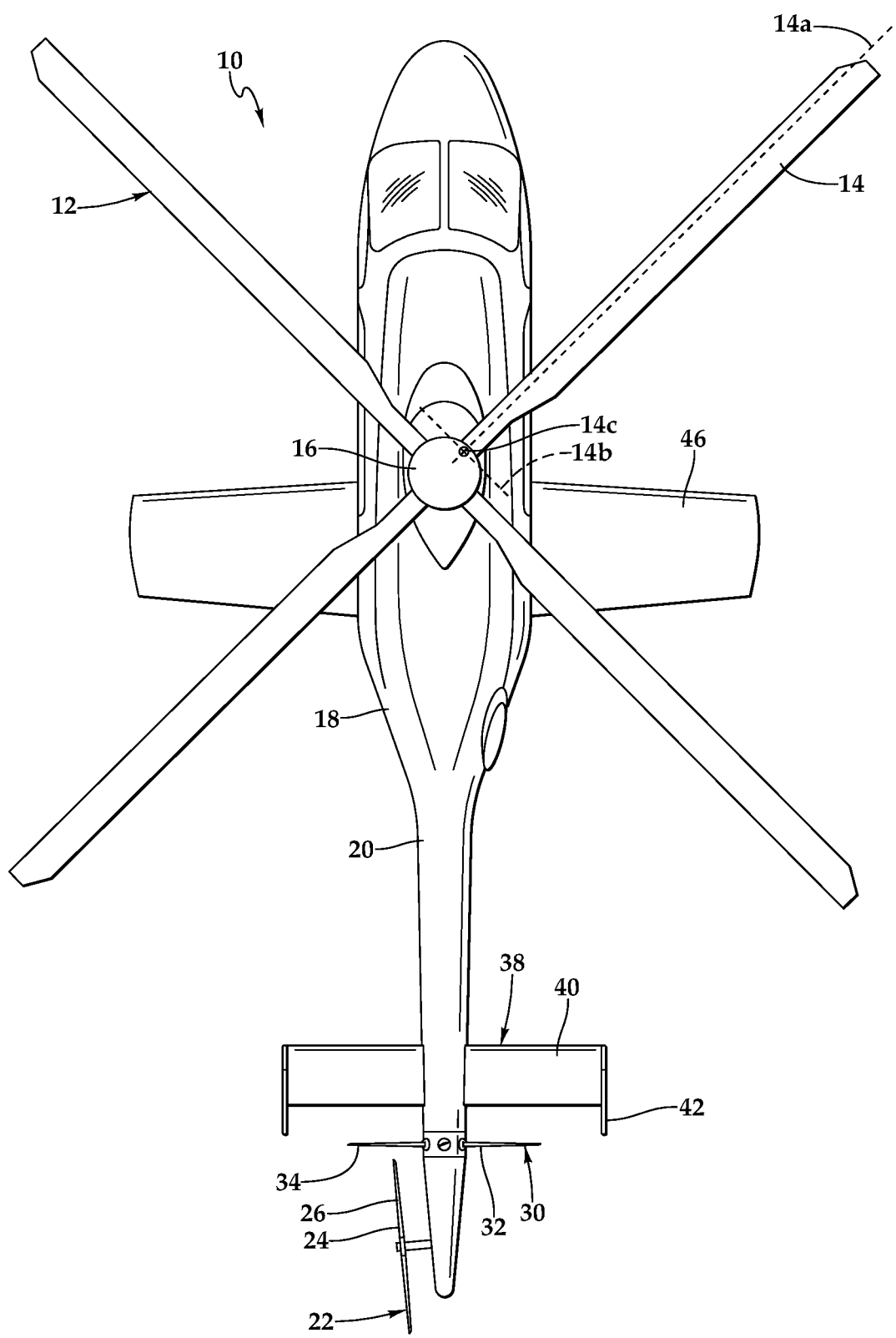

Referring to FIGS. 1A-1C in the drawings, a rotorcraft depicted as a compound helicopter is schematically illustrated and generally designated 10. The primary propulsion assembly of rotorcraft 10 is a main rotor system 12. Main rotor system 12 includes a plurality of rotor blades 14 extending radially outward from a main rotor hub 16. As illustrated, main rotor system 12 is a non-rigid main rotor system such as a fully articulated main rotor system in which each rotor blade 14 has a pitching degree of freedom relative to main rotor hub 16 about a pitch change axis 14a, a flapping degree of freedom relative to main rotor hub 16 about a flapping axis 14b and a lead-lag degree of freedom relative to main rotor hub 16 about a lead-lag axis 14c (extending into and out of the page), as best seen in FIG. 1C. In other embodiments, a main rotor system could be a semi-rigid or rigid main rotor system. Main rotor system 12 is coupled to a fuselage 18 via the drivetrain of rotorcraft 10 and is rotatable relative to fuselage 18. The pitch of rotor blades 14 can be collectively and/or cyclically manipulated to selectively control direction, thrust and lift of rotorcraft 10.

A tailboom 20 is coupled to fuselage 18 and extends from fuselage 18 in the aft direction. An anti-torque system 22 includes a tail rotor 24 coupled to an aft end of tailboom 20. Anti-torque system 22 controls the yaw of rotorcraft 10 by counteracting the torque exerted on fuselage 18 by main rotor system 12. In the illustrated embodiment, tail rotor 24 has four variable pitch tail rotor blades 26. In other embodiments, a tail rotor could have other numbers of rotor blades and/or the rotor blades could be fixed pitch. Positioned forward of anti-torque system 22 on tailboom 20 is a translational thrust system 30 including a pusher propeller 32 that propels rotorcraft 10 in a forward direction. Assisted by pusher propeller 32, rotorcraft 10 may be capable of high forward airspeed. By propelling rotorcraft 10 in the forward direction, pusher propeller 32 may also reduce the drag burden on main rotor system 12. Pusher propeller 32 may provide all the thrust necessary to propel rotorcraft 10 in the forward direction or may share the forward thrust load with main rotor system 12 during high speed flight.

In the illustrated embodiment, pusher propeller 32 include a plurality of variable pitch rotor blades 34. The pitch of rotor blades 34 is collectively controllable responsive to manual input by the pilot and/or automated commands from a flight control system 36. The collective range for the pitch of rotor blades 34 is configured to enable efficient generation of forward thrust in an engine powered mode of rotorcraft 10 as well as efficient generation of power in an autorotation mode of rotorcraft 10, wherein pusher propeller 32 is driven by the aerodynamic force of air moving through pusher propeller 32 responsive to the forward movement of rotorcraft 10 to generate power for main rotor system 12, as discussed herein. In the illustrated embodiment, pusher propeller 32 is positioned forward of tail rotor 24. In other embodiments, a pusher propeller could be aft of the tail rotor, below the tail rotor, offset from the tail rotor or otherwise relatively positioned to avoid interference between rotor blades 34 of pusher propeller 32 and tail rotor blades 26. In still other embodiments, a pusher propeller could be used on a rotorcraft without a tail rotor system.

A flight stabilizer 38 is coupled to tailboom 20 and positioned forward of pusher propeller 32. Pusher propeller 32 is thus interposed between tail rotor 24 and flight stabilizer 38. Flight stabilizer 38 provides orientational stability for rotorcraft 10 during forward flight. By positioning flight stabilizer 38 in front of pusher propeller 32 and tail rotor 24, flight stabilizer 38 at least partially obstructs a forward side of pusher propeller 32 to protect pusher propeller 32 and tail rotor 24 during flight. Flight stabilizer 38 includes a horizontal stabilizer 40 for pitch stability and vertical fins 42 for yaw stability during forward flight. Vertical fins 42 are coupled to the outboard ends of horizontal stabilizer 40. Flight stabilizer 38 may also include a central vertical fin 44 on the underside of tailboom 20 to provide additional yaw stability and protection of pusher propeller 32 and tail rotor 24 from ground strikes. In some embodiments, horizontal stabilizer 40 may include one or more movable control surfaces such as elevators for additional pitch control and vertical fins 42 may include one or more movable control surfaces such as rudders for additional yaw control. In other embodiments, tailboom 20 may not include a flight stabilizer and the forward side of pusher propeller 32 may be unobstructed. Rotorcraft 10 also includes wings 46 extending laterally from the sides of fuselage 18. Wings 46 produce lift while rotorcraft 10 is in forward flight, thereby partially or fully offloading the lift required of main rotor system 12. The lift provided by wings 46 may help to offset the reduced lift capacity of main rotor system 12 at high forward airspeeds. Wings 46 may be structurally separate wings or may form part of a unitary wing that traverses fuselage 18.

Figure 2A:
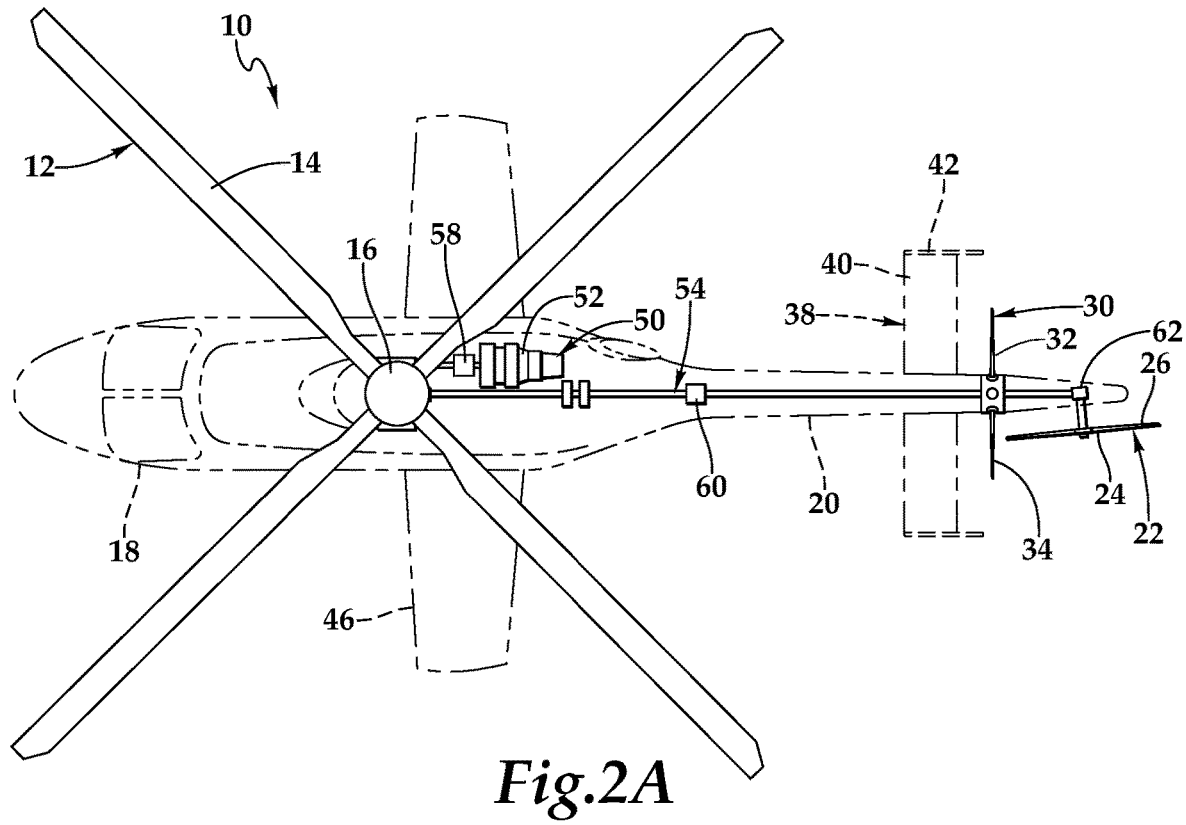
FIGS. 2A-2B are schematic illustrations of a powertrain for a rotorcraft having propeller generated power during autorotations in accordance with embodiments of the present disclosure.
Figure 2B:
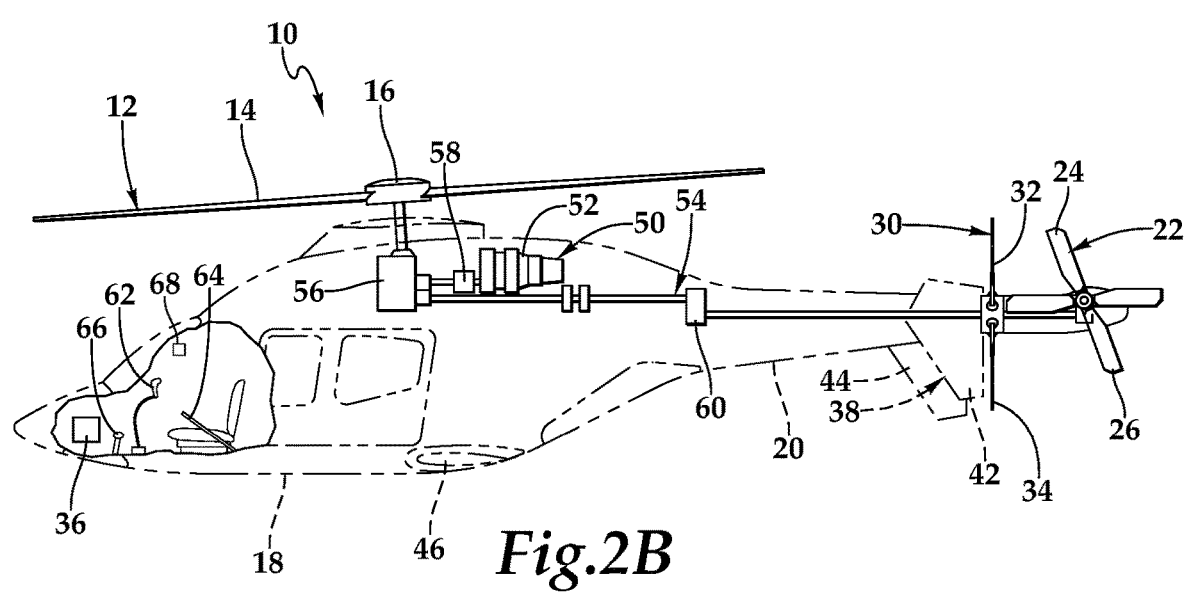

Referring to FIGS. 2A-2B in the drawings, a powertrain 50 for enabling propeller generated power during autorotations is schematically illustrated for rotorcraft 10. Powertrain 50 includes an engine 52 depicted as a turbo shaft engine. Engine 52 is coupled to a drivetrain 54 of powertrain 50 that distributes power generated by engine 52 to main rotor system 12, anti-torque system 22 and translational thrust system 30. Drivetrain 54 includes a main rotor gearbox depicted as transmission 56 that is coupled to main rotor system 12 by a suitable mast. Transmission 56 includes a gearbox housing and a plurality of gears, such as planetary gears, used to adjust the ratio of the engine output speed and the rotor speed so that engine 52 and main rotor system 12 may each rotate at optimum speed during flight operations of rotorcraft 10.

Positioned between engine 52 and transmission 56 is a freewheeling unit depicted as sprag clutch 58. Sprag clutch 58 acts as a one-way clutch enabling a driving mode in which torque and rotational energy from engine 52 is coupled to transmission 56 when the rotating speed of the input race, on the engine side of sprag clutch 58, is matched with the rotating speed of the output race, on the transmission side of sprag clutch 58. Importantly, sprag clutch 58 also has an overrunning mode in which engine 52 is decoupled from transmission 56 when the rotating speed of the input race is less than the rotating speed of the output race of sprag clutch 58. Operating sprag clutch 58 in the overrunning mode allows, for example, main rotor system 12 of rotorcraft 10 to engage in autorotation, in the event of a failure of engine 52. In the illustrated embodiment, transmission 56 and engine 52 are coupled to sprag clutch 58 via suitable driveshafts. In other embodiments, a sprag clutch could be integrated into either a transmission or an engine of a rotorcraft.

Drivetrain 54 includes an intermediate gearbox 60 that may change the gear ratio between transmission 56 and pusher propeller 32, as well as lower the elevation of the driveshaft between intermediate gearbox 60 and pusher propeller 32 relative to the driveshaft between intermediate gearbox 60 and transmission 56. Drivetrain 54 also includes a tail rotor gearbox 62 that includes a gearbox housing and a plurality of gears that transition the torque path approximately ninety degrees and may adjust the output speed to a suitable rotational speed for operation of tail rotor 24. Tail rotor gearbox 62 may be coupled to pusher propeller 32 via a suitable driveshaft. One or more clutching systems may be associated with pusher propeller 34 and/or tail rotor 24 to enable independent operation of pusher propeller 34 and tail rotor 24. In addition, as pusher propeller 32 has variable pitch rotor blades 34 and tail rotor 24 has variable pitch tail rotor blades 26, the thrusts produced by pusher propeller 32 and tail rotor 24 are independently controllable to operate rotorcraft 10 in a variety of modes including a forward thrust mode and an anti-torque mode. In the anti-torque mode, for example, the thrust produced by pusher propeller 32 may be minimized while the thrust produced by tail rotor 24 may be maximized such as during takeoffs, landings and hover operations. In the forward thrust mode, the thrust produced by pusher propeller 32 may be maximized while the thrust produced by tail rotor 24 may be minimized such as during high speed flight operations.

In the illustrated embodiment, rotorcraft 10 has a fly-by-wire control system that includes flight control system 36 that is preferably a redundant digital flight control system including multiple independent flight control computers. Flight control system 36 processes flight control inputs made by the pilot such as inputs to cyclic stick 62, collective lever 64 and anti-torque petals 66. Alternatively or additionally, flight control system 36 processes flight control inputs made by an autopilot system. Flight control system 36 then sends corresponding electrical signals to the flight control surface actuators to produce desired aerodynamic effects on the various rotorcraft systems such as main rotor system 12, pusher propeller 34 and tail rotor 24 to control movement of rotorcraft 10. In other embodiments, pilot flight control inputs to cyclic stick 62, collective lever 64 and anti-torque petals 66 may be mechanically and/or hydraulically coupled to flight control surface actuators. In addition, rotorcraft 10 may include numerous switches, knobs, buttons, levers or other pilot inputs for controlling various aspects of rotorcraft 10 such as a collective control input 68 for pusher propeller 32.

Figure 3A:
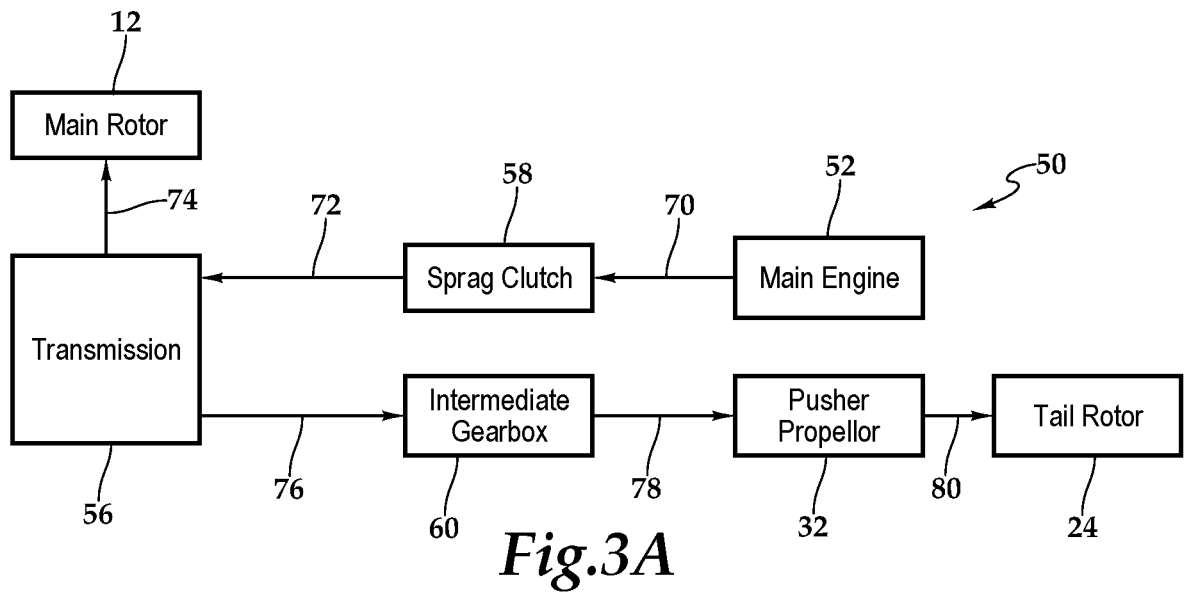
FIGS. 3A-3B are block diagrams of a powertrain for a rotorcraft having propeller generated power during autorotations in accordance with embodiments of the present disclosure.
Figure 3B:
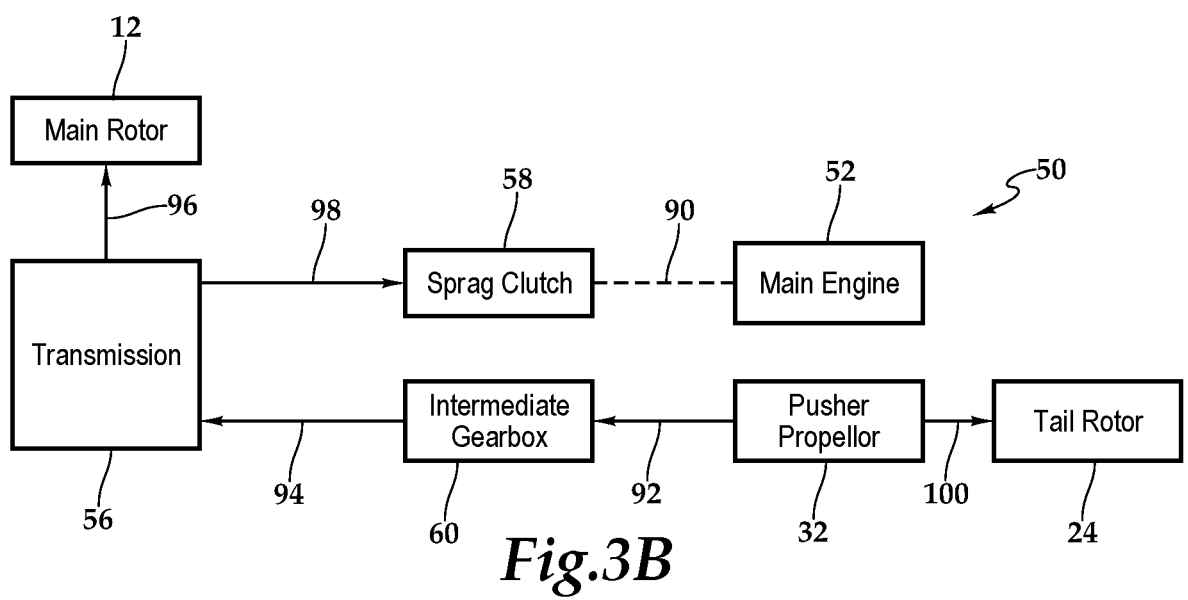

Referring additionally to FIGS. 3A-3B, powertrain 50 of rotorcraft 10 is depicted in a block diagram format. Powertrain 50 includes a main engine 52 that is coupled to a freewheeling unit depicted as sprag clutch 58 that has a driving mode enabling the engine powered mode of rotorcraft 10 and an overrunning mode enabling the autorotation mode of rotorcraft 10. Transmission 56 is coupled to sprag clutch 58 via a suitable driveshaft and to main rotor system 12 via a suitable mast. Transmission 56 is coupled to an intermediate gearbox 60 via one or more suitable driveshafts. Intermediate gearbox 60 is coupled to pusher propeller 32 and tail rotor 24 by one or more suitable driveshafts. Sprag clutch 58, transmission 56 and intermediate gearbox 60 as well as the various driveshafts, gear systems and clutching systems coupled thereto can be considered as the drivetrain of rotorcraft 10. The drivetrain together with engine 52 can be considered as the powertrain 50 of rotorcraft 10.

FIG. 3A represents the engine powered mode of rotorcraft 10 in which engine 52 is operable to deliver torque and rotational energy to main rotor system 12, pusher propeller 32 and tail rotor 24 as desired via the drivetrain. More specifically, torque and rotational energy are provided from engine 52 to transmission 56 through sprag clutch 58 as indicated by arrows 70, 72. This torque and rotational energy from engine 52 enables transmission 56 to drive main rotor system 12 as indicated by arrow 74. In addition, transmission 56 drives pusher propeller 32 and tail rotor 24 through intermediate gearbox 60 as indicated by arrows 76, 78, 80. This is the normal operating configuration of rotorcraft 10 with the normal torque path from engine 52 to main rotor system 12, pusher propeller 32 and tail rotor 24.

In the event of an engine failure in a conventional rotorcraft, the main rotor system engages in autorotation wherein the aerodynamic force of air moving up through the main rotor system drives the main rotor system, thereby reducing rotor speed decay and enabling a controlled glide of the rotorcraft to the ground. Upon final approach during an autorotation landing, a flare recovery maneuver may be performed to convert kinetic energy of the main rotor system into lift using aft cyclic control, to reduce the rate of descent and level off the flight path trajectory of the rotorcraft. Rotorcraft 10 of the present disclosure, however, does not rely solely on the aerodynamic force of air moving up through the main rotor system to power rotation of the main rotor system. Instead, rotorcraft 10 of the present disclosure, enhances rotorcraft safety and control during autorotations by extracting power from the airflow stream passing through pusher propeller 32 following an engine failure.

FIG. 3B represents the autorotation mode of rotorcraft 10 in which engine 52 is no longer operable to deliver torque and rotational energy to main rotor system 12, pusher propeller 32 or tail rotor 24. This state is represented by the dashed line 90 between engine 52 and sprag clutch 58. The forward airspeed of rotorcraft 10 provides a significant free stream airflow that impinges on rotor blades 34 of pusher propeller 32, particularly when rotorcraft 10 is engaged in high speed forward flight prior to the engine malfunction. To exact maximum power from the free stream airflow, the pitch of rotor blades 34 of pusher propeller 32 is preferable reduced from the forward thrust position responsive to pilot operation of collective control input 68 and/or responsive to an automated input to the flight control system 36, such as an engine failure signal, when rotorcraft 10 transitions from the engine powered mode to the autorotation mode.

The collective range of rotor blades 34 of pusher propeller 32 is configured such that pusher propeller 32 may act as a wind turbine in the autorotation mode of rotorcraft 10, wherein pusher propeller 32 is rotationally driven responsive to the aerodynamic force of air moving through pusher propeller 32 due to the forward motion of rotorcraft 10. The torque and rotational energy generated by pusher propeller 32 are delivered to transmission 56 via intermediate gearbox 60 and the various driveshafts therebetween enabling transmission 56 to drive main rotor system 12, as indicated by arrows 92, 94, 96. The rotary motion of transmission 56 is also transmitted to the output side of sprag clutch 58, as indicated by arrow 98. In the autorotation mode of rotorcraft 10, sprag clutch 58 is in the overrunning mode such that the torque path between transmission 56 and engine 52 is interrupted enabling rotation of main rotor system 12 independent of the operation of engine 52. In addition, torque and rotational energy from pusher propeller 32 drive tail rotor 24, as indicated by arrow 100.

The power provided by pusher propeller 32 helps to counteract main rotor speed decay and aids in main rotor speed recovery during autorotation. In addition, operating pusher propeller 32 in the wind turbine mode helps to reduce rotorcraft speed. In the illustrated embodiment, the glide speed of rotorcraft 10 can be managed using cyclic control and main rotor blade flapping, which can allow pusher propeller 32 to act solely as a wind turbine. Thus, the combination of a non-rigid main rotor system and a pusher propeller provides significant advantages not only during operations of rotorcraft 10 in the engine powered mode, but also during operations of rotorcraft 10 in the autorotation mode. Specifically, in the engine powered mode of rotorcraft 10, forward thrust can be generated by the main rotor system, the pusher propeller or both to enable high speed forward flight. In the autorotation mode of rotorcraft 10, safety is enhanced by supplying power to the main rotor system from the pusher propeller and by enabling the use of cyclic control of the main rotor system for speed management during autorotations.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotorcraft having an engine powered mode and an autorotation mode, the rotorcraft comprising:
    a fuselage;
    a tailboom coupled to and extending aftwardly from the fuselage;
    a flight stabilizer including first and second horizontal stabilizers coupled to and extending laterally from the tailboom such that the horizontal stabilizers are aft of the fuselage;
    an engine disposed within the fuselage;
    a drivetrain configured to receive torque and rotational energy from the engine in the engine powered mode;
    a main rotor system coupled to the drivetrain and rotatable to generate lift and forward thrust for the rotorcraft in the engine powered mode;
    a pusher propeller coupled to the drivetrain and rotatable to generate forward thrust for the rotorcraft in the engine powered mode, the pusher propeller coupled to the tailboom and positioned aft of the horizontal stabilizers; and
    a tail rotor system coupled to the drivetrain and rotatable to generate anti-torque thrust for the rotorcraft in the engine powered mode, the tail rotor system coupled to the tailboom and positioned aft of the pusher propeller such that the pusher propeller is interposed between the horizontal stabilizers and the tail rotor system;
    wherein, in the autorotation mode, the pusher propeller is aerodynamically driven responsive to airflow therethrough and the drivetrain is configured to receive torque and rotational energy from the pusher propeller, thereby providing power to the main rotor system.

2. The rotorcraft as recited in claim 1 wherein the drivetrain further comprises a transmission between the engine and the main rotor system, the transmission configured to adjust a rotating speed ratio between the engine and the main rotor system.

3. The rotorcraft as recited in claim 2 wherein the drivetrain further comprises a driveshaft coupling the transmission and the pusher propeller.

4. The rotorcraft as recited in claim 2 wherein the drivetrain further comprises a freewheeling unit coupled between the engine and the transmission.

5. The rotorcraft as recited in claim 4 wherein the freewheeling unit further comprises a sprag clutch.

6. The rotorcraft as recited in claim 1 wherein the main rotor system further comprises a non-rigid main rotor system.

7. The rotorcraft as recited in claim 1 wherein the main rotor system further comprises a fully articulated main rotor system.

8. The rotorcraft as recited in claim 1 wherein the main rotor system further comprises a plurality of rotor blades coupled to a rotor hub such that each rotor blade is configured to independently flap relative to the rotor hub about a flapping axis.

9. The rotorcraft as recited in claim 1 wherein the pusher propeller further comprises a plurality of variable pitch rotor blades.

10. The rotorcraft as recited in claim 9 wherein the pitch of the rotor blades of the pusher propeller is collectively controllable.

11. The rotorcraft as recited in claim 9 wherein the pitch of the rotor blades of the pusher propeller is greater in the engine powered mode than in the autorotation mode of the rotorcraft.

12. The rotorcraft as recited in claim 9 further comprising a manual input for reducing the pitch of the rotor blades of the pusher propeller when the rotorcraft transitions from the engine powered mode to the autorotation mode.

13. The rotorcraft as recited in claim 9 further comprising a flight control system configured to reduce the pitch of the rotor blades of the pusher propeller when the rotorcraft transitions from the engine powered mode to the autorotation mode.

14. The rotorcraft as recited in claim 1 wherein the tail rotor system further comprises variable pitch rotor blades.

15. The rotorcraft as recited in claim 1 wherein the flight stabilizer further comprises first and second vertical fins coupled to respective outboard ends of the first and second horizontal stabilizers.

16. The rotorcraft as recited in claim 1 wherein the flight stabilizer further comprises a central vertical fin on an underside of the tailboom to provide yaw stability and to protect the pusher propeller from ground strikes.

17. A rotorcraft having an engine powered mode and an autorotation mode, the rotorcraft comprising:
 a fuselage;
 a tailboom coupled to and extending aftwardly from the fuselage;
 a flight stabilizer including first and second horizontal stabilizers coupled to and extending laterally from the tailboom such that the horizontal stabilizers are aft of the fuselage;
 an engine disposed within the fuselage;
 a drivetrain configured to receive torque and rotational energy from the engine in the engine powered mode;
 a main rotor system coupled to the drivetrain and rotatable to generate lift and forward thrust for the rotorcraft in the engine powered mode;
 a pusher propeller coupled to the drivetrain and rotatable to generate forward thrust for the rotorcraft in the engine powered mode, the pusher propeller including a plurality of variable pitch rotor blades, the pusher propeller coupled to the tailboom and positioned aft of the horizontal stabilizers;
 a tail rotor system coupled to the drivetrain and rotatable to generate anti-torque thrust for the rotorcraft in the engine powered mode, the tail rotor system coupled to the tailboom and positioned aft of the pusher propeller such that the pusher propeller is interposed between the horizontal stabilizers and the tail rotor system; and
 a flight control system configured to collectively control the pitch of the rotor blades of the pusher propeller;
 wherein, in response to the rotorcraft transitioning from the engine powered mode to the autorotation mode, the flight control system reduces the pitch of the rotor blades of the pusher propeller; and
 wherein, in the autorotation mode, the pusher propeller is aerodynamically driven responsive to airflow therethrough and the drivetrain is configured to receive torque and rotational energy from the pusher propeller, thereby providing power to the main rotor system.

18. The rotorcraft as recited in claim 17 wherein the drivetrain further comprises:
 a transmission between the engine and the main rotor system, the transmission configured to adjust a rotating speed ratio between the engine and the main rotor system;
 a driveshaft coupling the transmission and the pusher propeller; and
 a freewheeling unit coupled between the engine and the transmission.

19. The rotorcraft as recited in claim 17 wherein the main rotor system further comprises a fully articulated main rotor system including a plurality of rotor blades coupled to a rotor hub such that each rotor blade is configured to independently flap relative to the rotor hub about a flapping axis.

20. A rotorcraft having an engine powered mode and an autorotation mode, the rotorcraft comprising:
 a fuselage;
 a tailboom coupled to and extending aftwardly from the fuselage;
 a flight stabilizer including first and second horizontal stabilizers coupled to and extending laterally from the tailboom such that the horizontal stabilizers are aft of the fuselage;
 an engine disposed within the fuselage;
 a drivetrain configured to receive torque and rotational energy from the engine in the engine powered mode;
 a main rotor system coupled to the drivetrain and rotatable to generate lift and forward thrust for the rotorcraft in the engine powered mode, the main rotor system including a plurality of rotor blades coupled to a rotor hub such that each rotor blade has a pitching degree of freedom and a flapping degree of freedom;
 a pusher propeller coupled to the drivetrain and rotatable to generate forward thrust for the rotorcraft in the engine powered mode, the pusher propeller coupled to the tailboom and positioned aft of the horizontal stabilizers; and
 a tail rotor system coupled to the drivetrain and rotatable to generate anti-torque thrust for the rotorcraft in the engine powered mode, the tail rotor system coupled to the tailboom and positioned aft of the pusher propeller such that the pusher propeller is interposed between the horizontal stabilizers and the tail rotor system;
 wherein, in the autorotation mode, the pusher propeller is aerodynamically driven responsive to airflow therethrough and the drivetrain is configured to transfer torque and rotational energy from the pusher propeller to the main rotor system to counteract main rotor speed decay and aid in main rotor speed recovery; and
 wherein, in the autorotation mode, a glide speed of the rotorcraft is controlled responsive to cyclic pitch control and rotor blade flapping of the main rotor system such that the pusher propeller acts solely as a wind turbine.

* * * * *